US012729846B2

(12) United States Patent
Deutsch et al.

(10) Patent No.: US 12,729,846 B2
(45) Date of Patent: Sep. 8, 2026

(54) SEALING A LIGHTING FIXTURE WITH DRY GAS

(71) Applicant: Metro Marine LLC, Englewood, NJ (US)

(72) Inventors: Daniel Deutsch, New York, NY (US); Michael Vincent Fedele, Englewood, NJ (US)

(73) Assignee: Metro Marine LLC, Englewood, NJ (US)

( * ) Notice: Subject to any disclaimer, the term of this patent is extended or adjusted under 35 U.S.C. 154(b) by 63 days.

(21) Appl. No.: 18/818,431

(22) Filed: Aug. 28, 2024

(65) Prior Publication Data

US 2024/0418357 A1 Dec. 19, 2024

Related U.S. Application Data

(62) Division of application No. 17/881,775, filed on Aug. 5, 2022, now Pat. No. 12,092,309.

(51) Int. Cl.
*F21V 31/04* (2006.01)
*F21K 9/90* (2016.01)
*F21V 31/00* (2006.01)

(52) U.S. Cl.
CPC ............ *F21V 31/04* (2013.01); *F21V 31/005* (2013.01); *F21K 9/90* (2013.01)

(58) Field of Classification Search
CPC ........ F21V 31/04; F21V 31/00; F21V 31/005; F21V 23/006; F21W 2131/401; F21K 9/90
See application file for complete search history.

(56) References Cited

U.S. PATENT DOCUMENTS 3,888,111 A 6/1975 Craig
4,450,660 A * 5/1984 Dean ..................... E06B 3/6608 29/455.1
5,022,930 A * 6/1991 Ackerman .......... H10F 77/1696 438/66
5,743,632 A * 4/1998 Carl ........................ F21V 31/03 362/373
6,694,709 B2 * 2/2004 Takahashi ............... B65B 31/02 53/107
(Continued)

FOREIGN PATENT DOCUMENTS

DE 3312747 A1 12/1983

OTHER PUBLICATIONS

Extended European Search Report in European Appln. No. 23850847.7, mailed on Oct. 27, 2025, 14 pages.
(Continued)

*Primary Examiner* — Zheng Song
*Assistant Examiner* — James M Endo
(74) *Attorney, Agent, or Firm* — Fish & Richardson P.C.

(57) ABSTRACT

An underwater light fixture and a method for making the underwater light fixture are provided. The method includes assembling a light fixture in a housing, leaving a fastener out of the light fixture, wherein an opening for the fastener fluidically couples to open volume in the housing. The housing is placed in a vacuum chamber, and a vacuum is pulled on the vacuum chamber to remove air from the open volume of the housing. A dry gas is introduced into the vacuum chamber to fill the open volume in the housing, and the fastener is installed in the light fixture to seal the open volume.

17 Claims, 9 Drawing Sheets

(56) References Cited

U.S. PATENT DOCUMENTS

| | | | | |
|---|---|---|---|---|
| 7,738,235 | B2 | 6/2010 | Gloisten et al. | |
| 8,167,468 | B1 * | 5/2012 | Olsson | F21V 29/58 362/267 |
| 8,794,794 | B2 * | 8/2014 | Kato | F21V 23/006 362/249.02 |
| 10,415,764 | B1 * | 9/2019 | Lei | F21K 9/232 |
| 10,436,437 | B1 | 10/2019 | Usher et al. | |
| 10,517,972 | B2 * | 12/2019 | Usher | A61L 2/08 |
| 10,786,584 | B2 | 9/2020 | Usher et al. | |
| 12,092,309 | B2 | 9/2024 | Deutsch et al. | |
| 2002/0122446 | A1 * | 9/2002 | Kimura | H01S 5/0222 372/36 |
| 2003/0183916 | A1 * | 10/2003 | Heck | B81C 1/00293 257/E23.128 |
| 2006/0187652 | A1 | 8/2006 | Doyle | |
| 2006/0198128 | A1 | 9/2006 | Piepgras | |
| 2007/0139913 | A1 * | 6/2007 | Savage | F21V 15/01 362/101 |
| 2007/0224713 | A1 | 9/2007 | Han et al. | |
| 2009/0268470 | A1 | 10/2009 | Okimura | |
| 2010/0142199 | A1 * | 6/2010 | Liu | F21V 29/763 362/234 |
| 2011/0050073 | A1 * | 3/2011 | Huang | F21V 29/70 313/317 |
| 2011/0114840 | A1 * | 5/2011 | Yamazaki | G01J 5/04 29/841 |
| 2012/0306340 | A1 | 12/2012 | Hoetzl | |
| 2013/0170233 | A1 | 7/2013 | Nezu | |
| 2014/0022718 | A1 | 1/2014 | Yamazaki et al. | |
| 2014/0111998 | A1 | 4/2014 | Miller et al. | |
| 2015/0330617 | A1 | 11/2015 | Hoetzl | |
| 2015/0375551 | A1 | 12/2015 | Cho et al. | |
| 2016/0084424 | A1 * | 3/2016 | Kuhn | F16L 59/065 53/427 |
| 2016/0084483 | A1 | 3/2016 | Dubuc | |
| 2016/0260876 | A1 * | 9/2016 | Sun | F21K 9/232 |
| 2017/0051880 | A1 | 2/2017 | Joye | |
| 2017/0130950 | A1 | 5/2017 | Olsson et al. | |
| 2017/0184258 | A1 | 6/2017 | Yu | |
| 2018/0058678 | A1 | 3/2018 | Lockard | |
| 2018/0238533 | A1 | 8/2018 | Dyck | |
| 2018/0286726 | A1 * | 10/2018 | Rebstock | H01L 21/02041 |
| 2019/0093863 | A1 * | 3/2019 | Lozeau | F21V 31/00 |
| 2019/0360685 | A1 | 11/2019 | Usher et al. | |
| 2020/0011490 | A1 * | 1/2020 | Lei | F21K 9/232 |
| 2020/0400288 | A1 | 12/2020 | Zhang | |
| 2021/0080063 | A1 * | 3/2021 | Lei | F21K 9/232 |
| 2021/0197304 | A1 * | 7/2021 | Wang | B23K 1/0016 |
| 2021/0362395 | A1 | 11/2021 | Effenberger et al. | |
| 2022/0186921 | A1 | 6/2022 | Raposo et al. | |
| 2024/0044481 | A1 | 2/2024 | Deutsch et al. | |

OTHER PUBLICATIONS

International Search Report and Written Opinion in International Appln. No. PCT/US2023/070887, mailed on Dec. 26, 2023, 15 pages.

International Preliminary Report on Patentability in International Appln. No. PCT/US2023/070887, mailed on Feb. 20, 2025, 11 pages.

Extended European Search Report in European Appln. No. 23850847.7, mailed on Jan. 16, 2026, 15 pages.

* cited by examiner

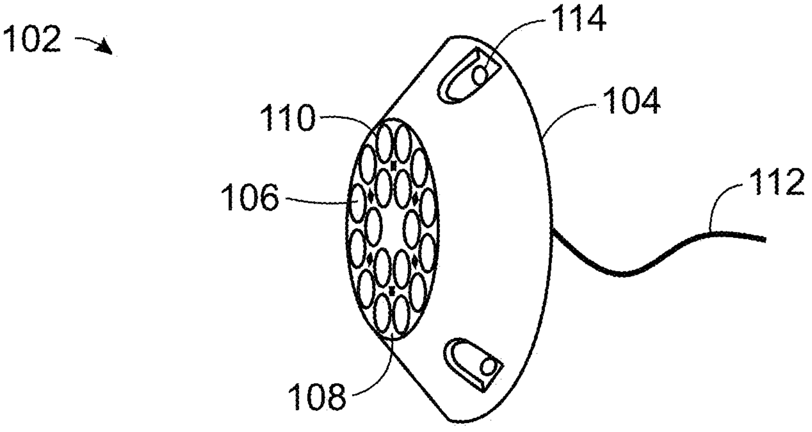
FIG. 1A
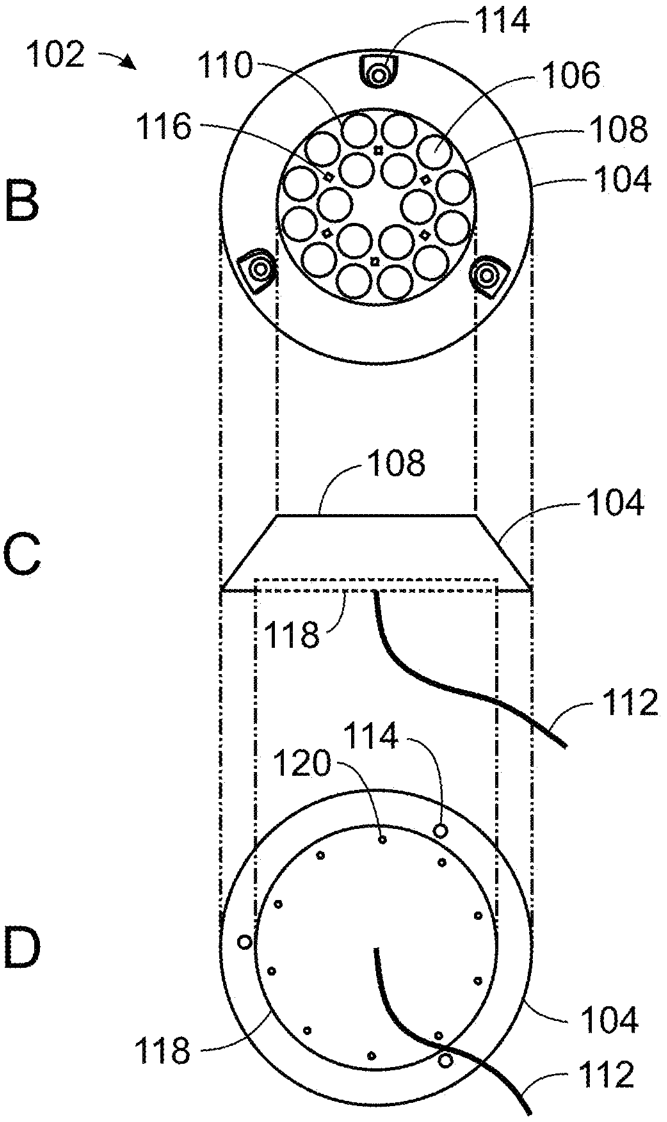
FIG. 1B
FIG. 1C
FIG. 1D

SEALING A LIGHTING FIXTURE WITH DRY GAS

RELATED APPLICATIONS

This application claims priority to U.S. patent application Ser. No. 17/881,775, filed on Aug. 5, 2022, the entire content of which is hereby incorporated by reference herein.

TECHNICAL FIELD

The present disclosure is directed to filling lighting fixtures used for under water lights with a dry gas.

BACKGROUND

Condensation of materials, such as water or organic materials, is a problem in underwater lighting fixtures. The high temperature difference between the lighting elements and the face of the fixture can vaporize materials that condense on the interior of the face. Further, after the fixture is powered off, cooling can cause materials to condense on the circuitry. This may lead to premature failure of the fixture.

SUMMARY

An embodiment described herein provides a method for making an underwater light fixture. The methods includes assembling a light fixture in a housing, leaving a fastener out of the light fixture, wherein an opening for the fastener fluidically couples to open volume in the housing. The housing is placed in a vacuum chamber, and a vacuum is pulled on the vacuum chamber to remove air from the open volume of the housing. A dry gas is introduced into the vacuum chamber to fill the open volume in the housing, and the fastener is installed in the light fixture to seal the open volume.

Another embodiment described in examples herein provides an underwater light fixture. The underwater light fixture includes a casing including a housing and a back plate, wherein the housing includes an opening for light exiting the housing, and the back plate includes an opening for a cable. A lighting circuit board that is mounted in the housing with visible lighting elements mounted on a front surface directed at the opening in the housing. The underwater light fixture includes a lens plate that is mounted over the lighting elements, and a clear plate that is mounted over the opening in the housing. The underwater light fixture includes a control circuit board that is mounted to the back of the lighting circuit board, wherein the back plate is mounted over the control circuit board. The underwater light fixture includes a cable coupled to the lighting circuit board and a dry gas disposed in open space in the housing.

BRIEF DESCRIPTION OF DRAWINGS

FIG. 1A is a perspective view of an underwater light fixture designed to be surface mounted.

FIGS. 1B-1D are various perspective views of the underwater light fixture.

DETAILED DESCRIPTION

Figure 2A:
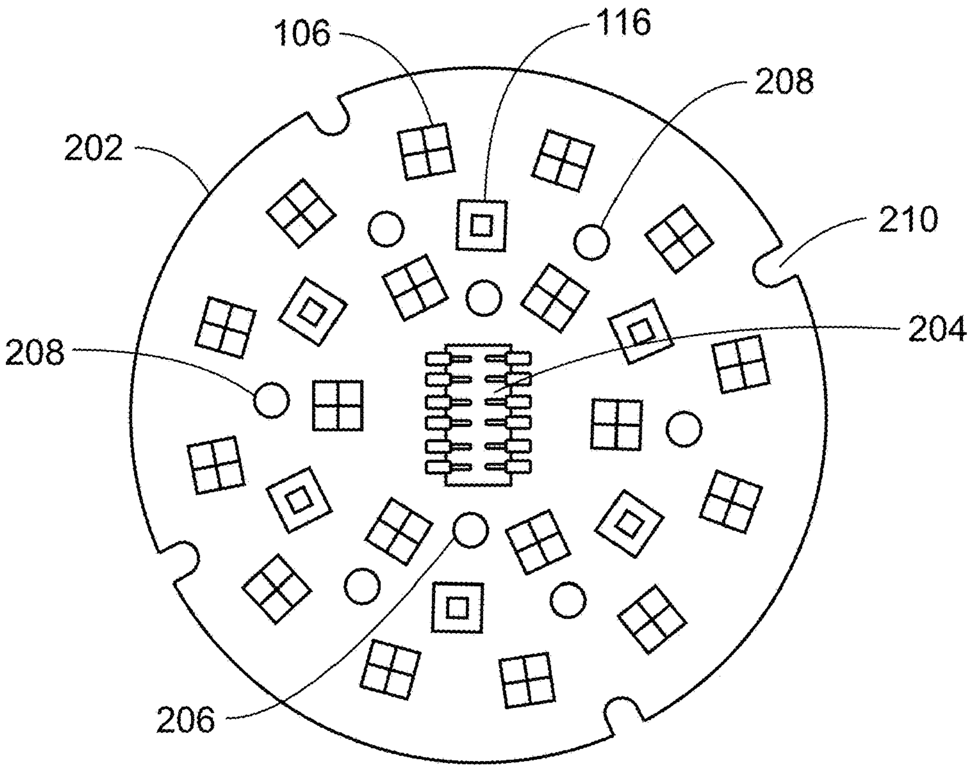
FIG. 2A is a front view of a lighting circuit board used in the underwater light fixture.

Underwater lighting fixtures, for example, mounted to boats, docks, piers, and the like, are susceptible to the formation of condensation. The condensation may lead to lower lighting efficiency, a decreased lifespan or both. Assembly techniques for protecting an underwater light fixture from condensation and an underwater light fixture that is less susceptible to condensation are provided herein.

During the assembly of the underwater light fixture, the underwater light fixtures are placed in a vacuum chamber to pull humid air from open spaces within a housing of the underwater light fixture. A dry gas is introduced to the vacuum chamber to fill the open spaces within the housing. The dew point of the dry gas selected depends on the temperature of use of the underwater light fixture. For example, an underwater light fixture for a polar application may require a lower dew point than an underwater light fixture for use in warmer climates. In some embodiments, the dry gas is nitrogen with a dew point of between about −70° F. (−57° C.) and about −94° F. (−70° C.). Other dry gases, from compressed gas cylinders or drying systems, may be used, including dry air, argon, helium, and the like. Further, multiple vacuum and gas introduction cycles may be performed to decrease the dew point of any gas remaining in the open spaces of the housing.

FIG. 1A is a perspective view of an underwater light fixture 102 designed to be surface mounted. The techniques described herein are not limited to this type of underwater light fixture 102, but may be used to protect any number of different types of underwater light fixtures from condensation, including surface mounted fixtures of different shapes, post-mounted light fixtures, portable light fixtures, through-hull light fixtures, and the like.

In FIG. 1A, the housing 104 holds and protects lighting elements 106 from the environment, for example, embedding the lighting elements 106 in the housing 104 with a clear faceplate mounted over an opening 108 in the front of the housing 104. Each of the lighting elements 106 has a lens covering the lighting element to focus the light into the environment through the opening 108. A cable 112 provides power to the underwater light fixture 102. In this embodiment, mounting holes 114 are provided in the housing 104 to allow the use of fasteners, such as marine screws, to fasten the underwater light fixture 102 to a surface, for example, the hull of a boat. To simplify the figures, not every item of a single type is labeled. For example, the underwater light fixture 102, shown in FIGS. 1A to 1D, has 18 lighting elements 106 arranged in an inner circle of 6 and an outer circle of 12.

Any number of arrangements of the lighting elements 106, and other design features, may be used in embodiments. For example, in an embodiment, an oblong underwater light fixture has 18 lighting elements 106 arranged in 2 rows of 9 each. Similar changes are seen in the mounting, depending on the type of fixture, for example, with an oblong underwater light fixture having 4 mounting holes, 2 along each side. In some embodiments, the underwater light fixture is mounted on the threaded end of a conduit, with the cable 112 passing through the conduit.

FIGS. 1B-1D are various perspective views of the underwater light fixture 102. FIG. 1B is a top view of the underwater light fixture 102. In the top view, the lighting elements 106 are visible through the opening 108 at the top of the housing 104. In some embodiments, the underwater light fixture 102 includes UV lighting elements 116 that emit ultraviolet light (UVC) to inhibit the formation of biofilms over the clear faceplate of the opening 108. Other embodiments do not include the UV lighting elements 116. FIG. 1C is a side view of the underwater light fixture 102, showing a bottom plate 118 that is mounted in a recessed channel in the housing 104. FIG. 1D is a back view of the underwater light fixture 102, showing the bottom plate 118, which is held to the housing 104 using a series of mounting screws installed in mounting holes 120 in the housing 104. As described with respect to FIG. 1A, the techniques are not limited to the underwater light fixture 102 shown in FIGS. 1A-1D. Any number of different configurations may be used in embodiments described herein.

FIG. 2A is a front view of a lighting circuit board 202 used in the underwater light fixture 102. In this view, it can be seen that the lighting elements 106 may include multiple light emitters, such as light emitting diodes (LEDs) of multiple colors. In some embodiments, the LEDs of each of the lighting elements 106 includes blue, red, green, and white LEDs. In some embodiments, the underwater light fixture 102 emits monochromatic light. In these embodiments, all of the LEDs may be blue, white, and green, amber violet, or red, among others. As described with respect to FIGS. 1A-1D, to simplify the figures, not every instance of an item is labeled. For example, FIG. 2A illustrates six UVC lighting elements 116, although not every instance is labeled.

FIG. 2A shows a pass-through connector 204 that couples the circuitry on the front of the lighting circuit board 202, including the lighting elements 106, through the lighting circuit board 202 to pins 212 that couple to a control circuit board. At each longitudinal end of the pass-through connector 204, there is a mounting hole 206 for a screw to be inserted from the control circuit board as described herein. The mounting hole 206 passes through the lighting circuit board 202, fluidically coupling the back of the lighting circuit board 202 to the open space in the underwater light fixture 102 that is in front of the lighting circuit board 202. The lighting circuit board 202 also includes six mounting holes 208 used to mount the lighting circuit board 202 to the housing 104 (FIG. 1A). Four notches 210 in the lighting circuit board 202 allow access to screw holes in the housing 104 for mounting a lens plate over the lighting circuit board 202, as described herein.

Figure 2B:
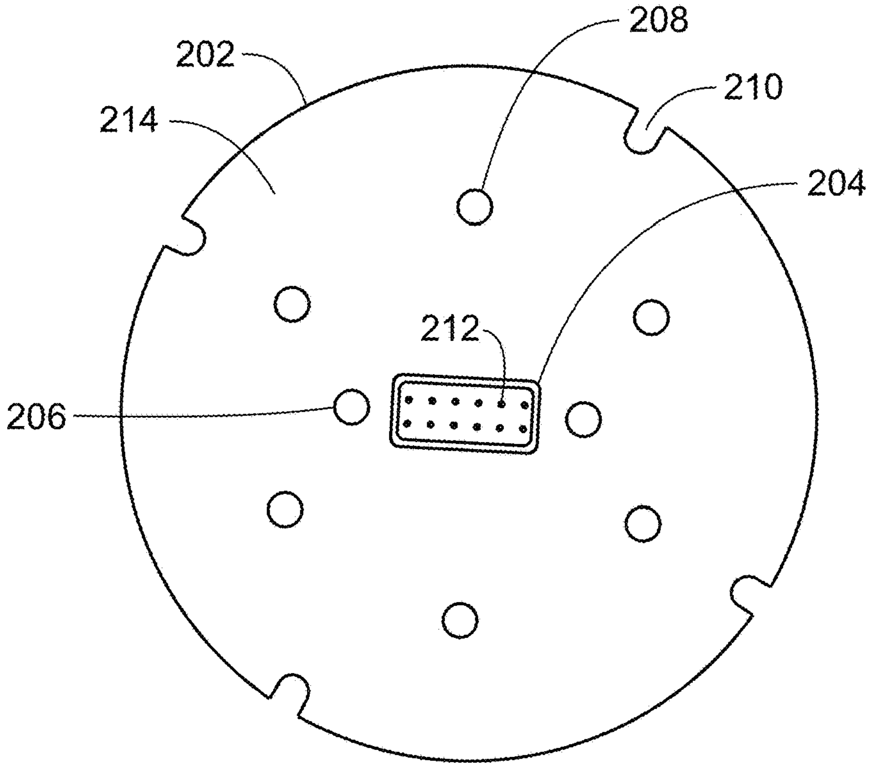
FIG. 2B is a back view of the lighting circuit board used in the underwater light fixture.

FIG. 2B is a back view of the lighting circuit board 202 used in the underwater light fixture. In some embodiments, a thermal pad 214 is applied to the back of the lighting circuit board 202, for example, to protect the circuitry on the control circuit board from the heat generated by the LEDs of the lighting elements 106 and 114.

Figure 3A:
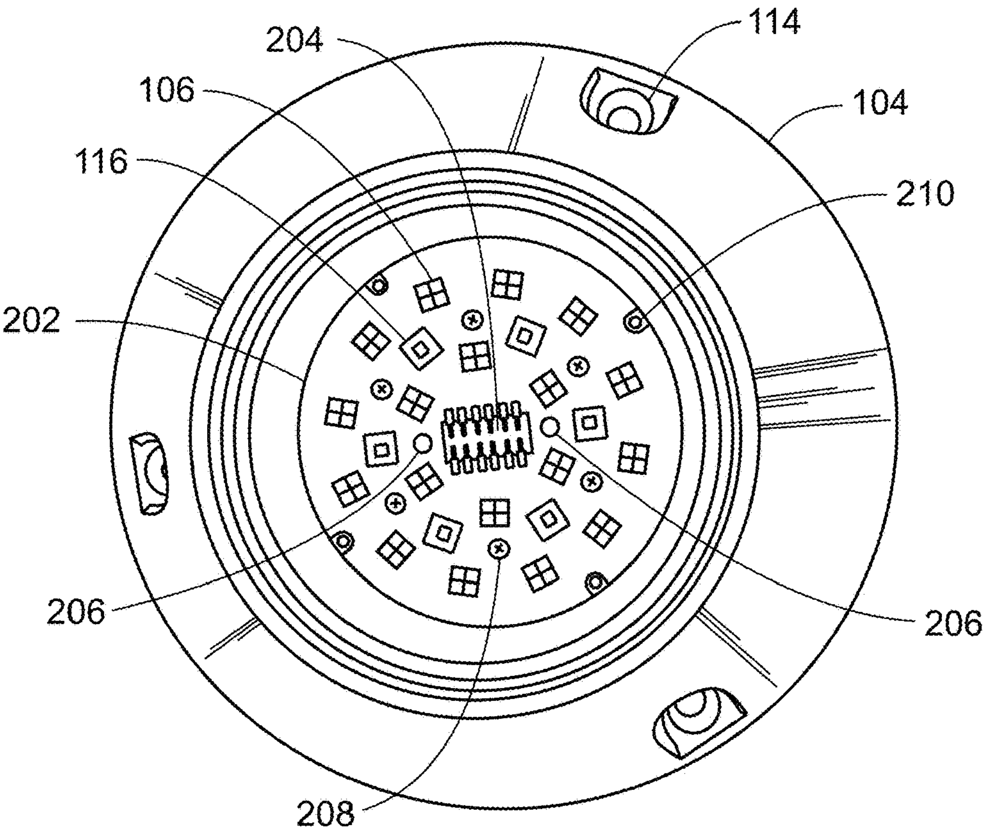
FIG. 3A is a front view of a housing with the lighting circuit board mounted in the housing.

FIG. 3A is a front view of the housing 104 with the lighting circuit board 202 mounted in the housing 104. In this embodiment, the lighting circuit board 202 is mounted through screws that are inserted through the mounting holes 208 around the circumference of the lighting circuit board 202. As shown in FIG. 3A, the mounting holes 206 at each end of the pass-through connector 204 remain open between the front of the lighting circuit board 202 and the back of the lighting circuit board 202.

Figure 3B:
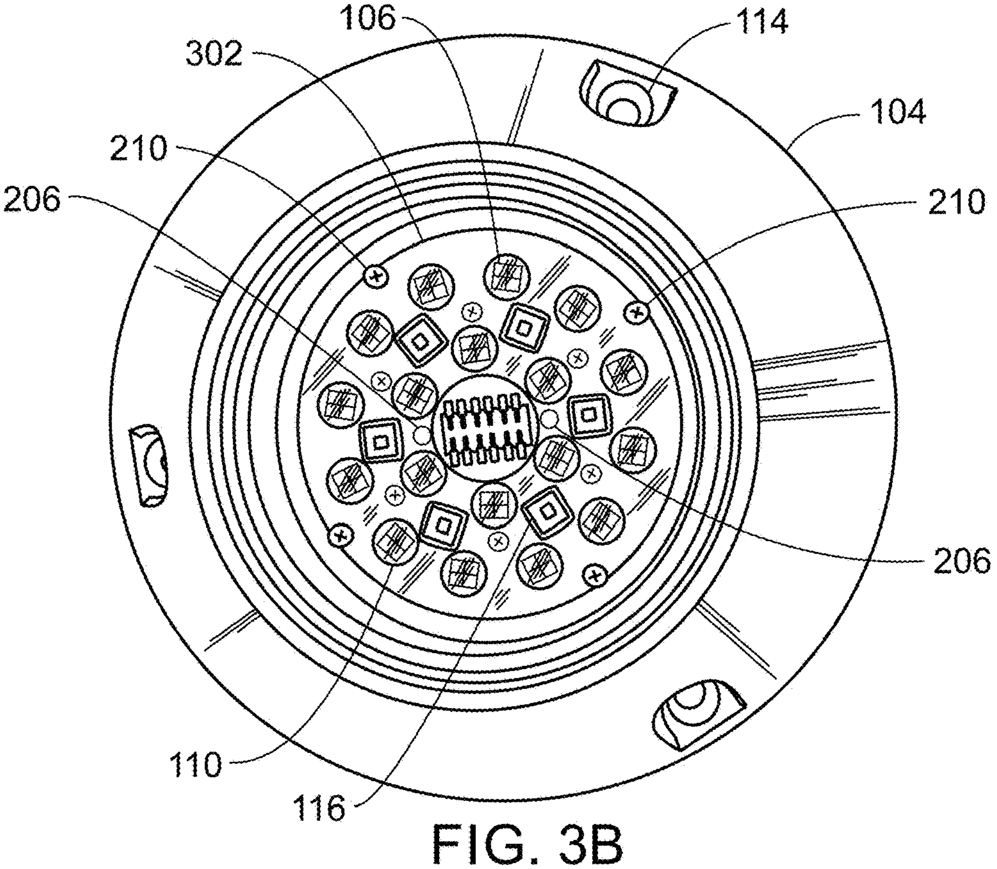
FIG. 3B is a front view of the housing with a lens panel mounted over the lighting circuit board.

FIG. 3B is a front view of the housing 104 with a lens panel 302 mounted over the lighting circuit board 202. The lens panel 302 includes individual lenses 110 that are positioned over each of the lighting elements 106. In embodiments that include UV lighting elements 116, the lens panel 302 does not cover the UV lighting elements 116. In various embodiments, the lens panel 302 is made from polycarbonate, polyacrylate, quartz, or glass, among other materials.

Figure 4A:
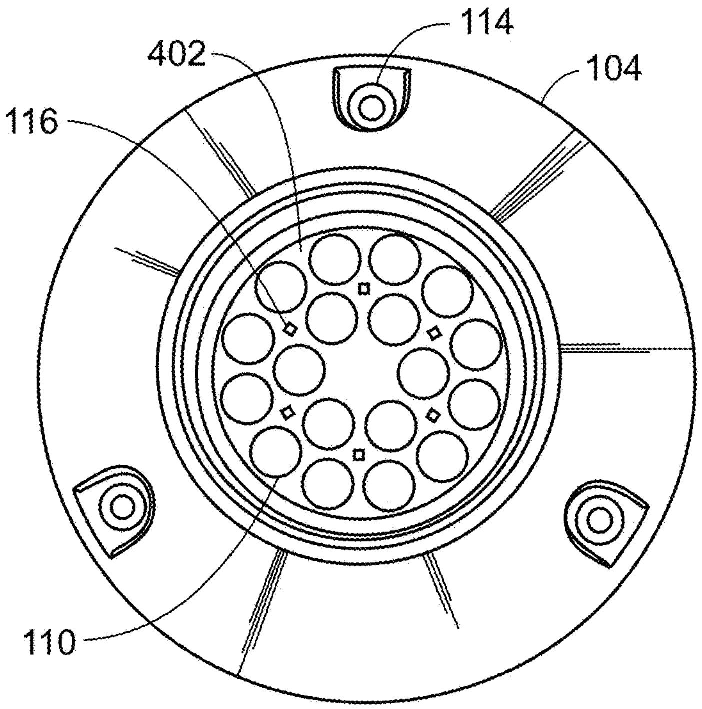
FIG. 4A is a front view of the housing with a decorative panel mounted over the lens panel.
Figure 4B:
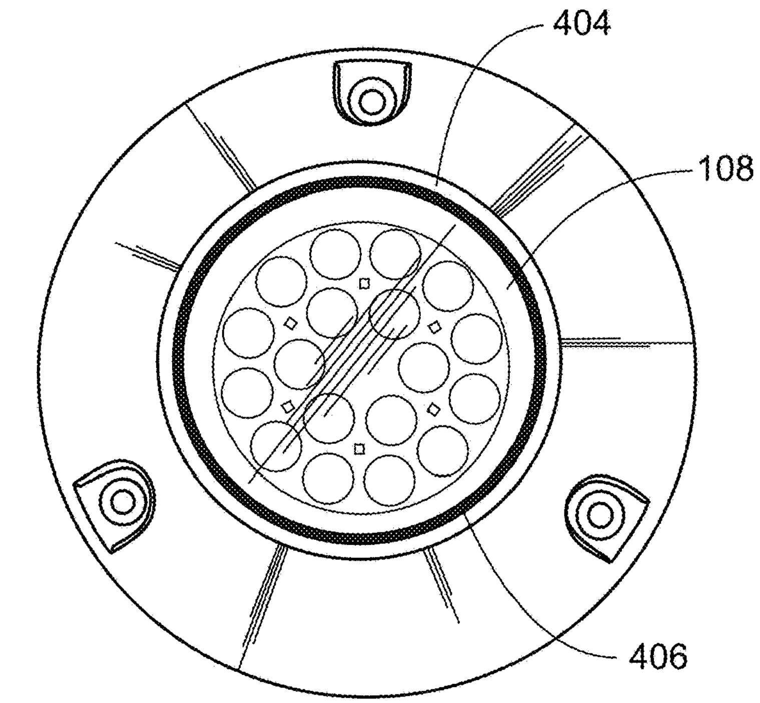
FIG. 4B is a front view of the housing with a clear faceplate mounted over the opening in the housing.

FIG. 4A is a front view of the housing 104 with a decorative panel 402 mounted over the lens panel 302. In embodiments in which the decorative panel 402 is used, it covers the circuitry of the lighting circuit board 202. FIG. 4B is a front view of the housing 104 with a clear faceplate 404 mounted over the opening 108 in the housing 104. In various embodiments, the clear faceplate 404 is made from quartz, glass, a microcrystalline spinel structure, or a sapphire, among others. In some embodiments, the clear faceplate 404 is mounted in the opening 108 by the installation of an O-ring 406 in a channel around the opening 108, then mounting the clear faceplate 404 over the O-ring, for example, using an adhesive. In some embodiments, the adhesive is a UV cured liquid adhesive. In other embodiments, the adhesive is a thermoplastic elastomer, a flexible RTV compound, or an elastomeric epoxy, among others.

Figure 5A:
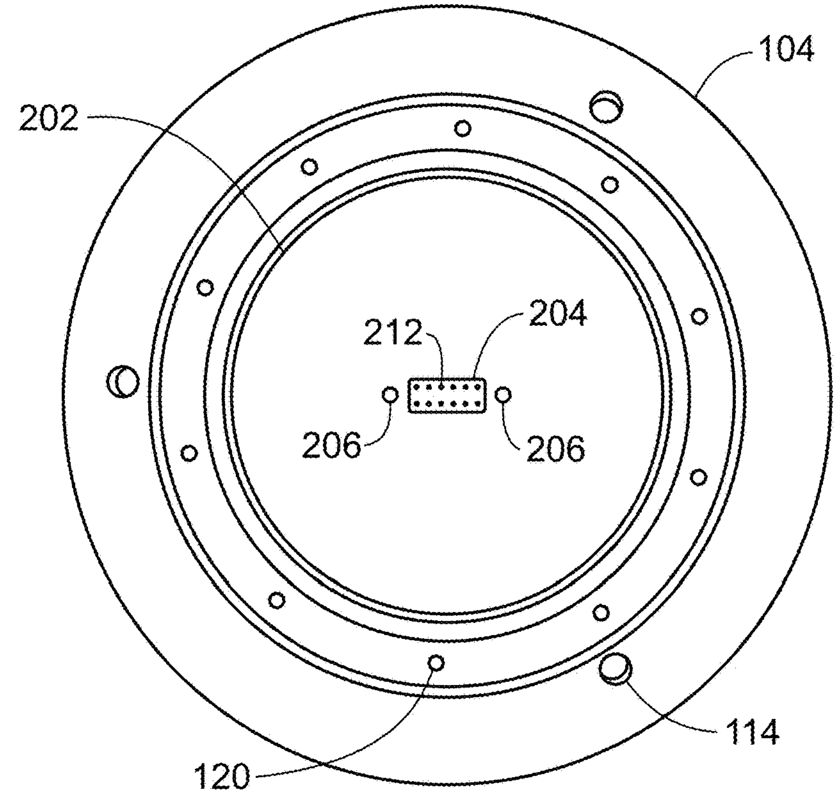
FIG. 5A is a rear view of the housing showing the back of the lighting circuit board.
Figure 5B:
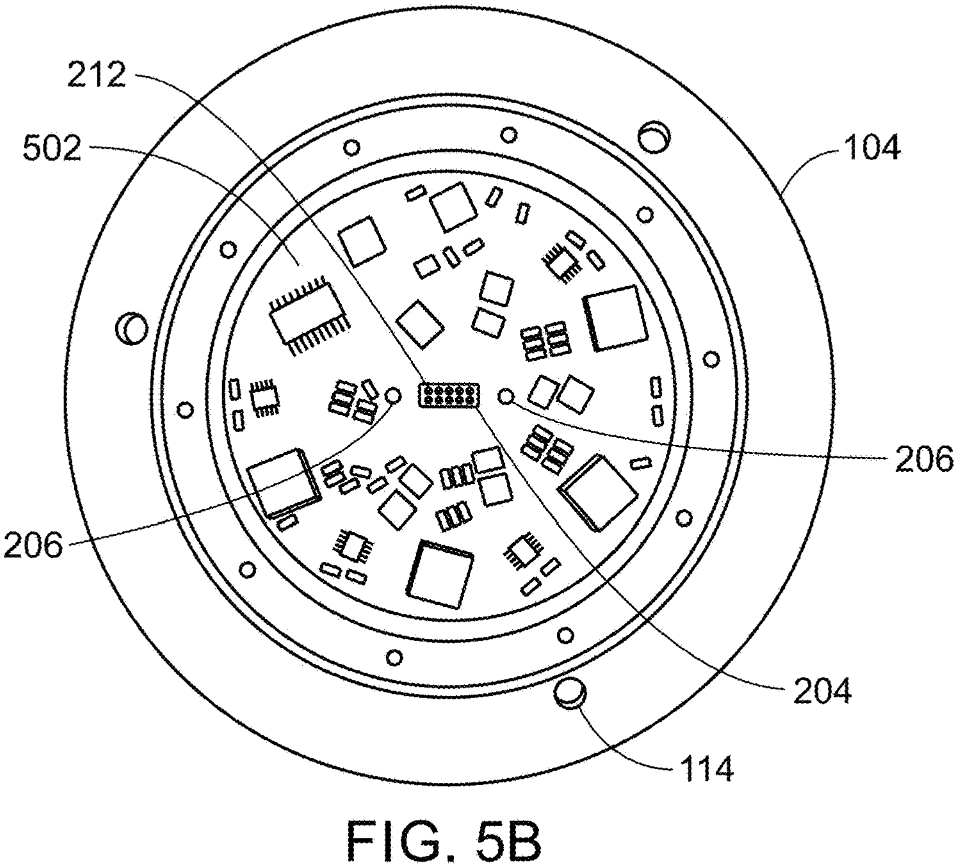
FIG. 5B is a rear view of the housing showing the control circuit board mounted to the back of the lighting circuit board.

FIG. 5A is a rear view of the housing 104 showing the back of the lighting circuit board 202. In this embodiment, the control circuit board 502 is then installed over the pins 212 of the pass-through connector 204. FIG. 5B is a rear view of the housing showing the control circuit board mounted to the back of the lighting circuit board 202. A mounting screw is installed through one of the mounting holes 206 at each end of the pass-through connector 204. The remaining mounting hole is left empty, and the partially completed lighting fixture 102 is placed in a vacuum oven, as described further with respect to FIG. 6.

Figure 6:
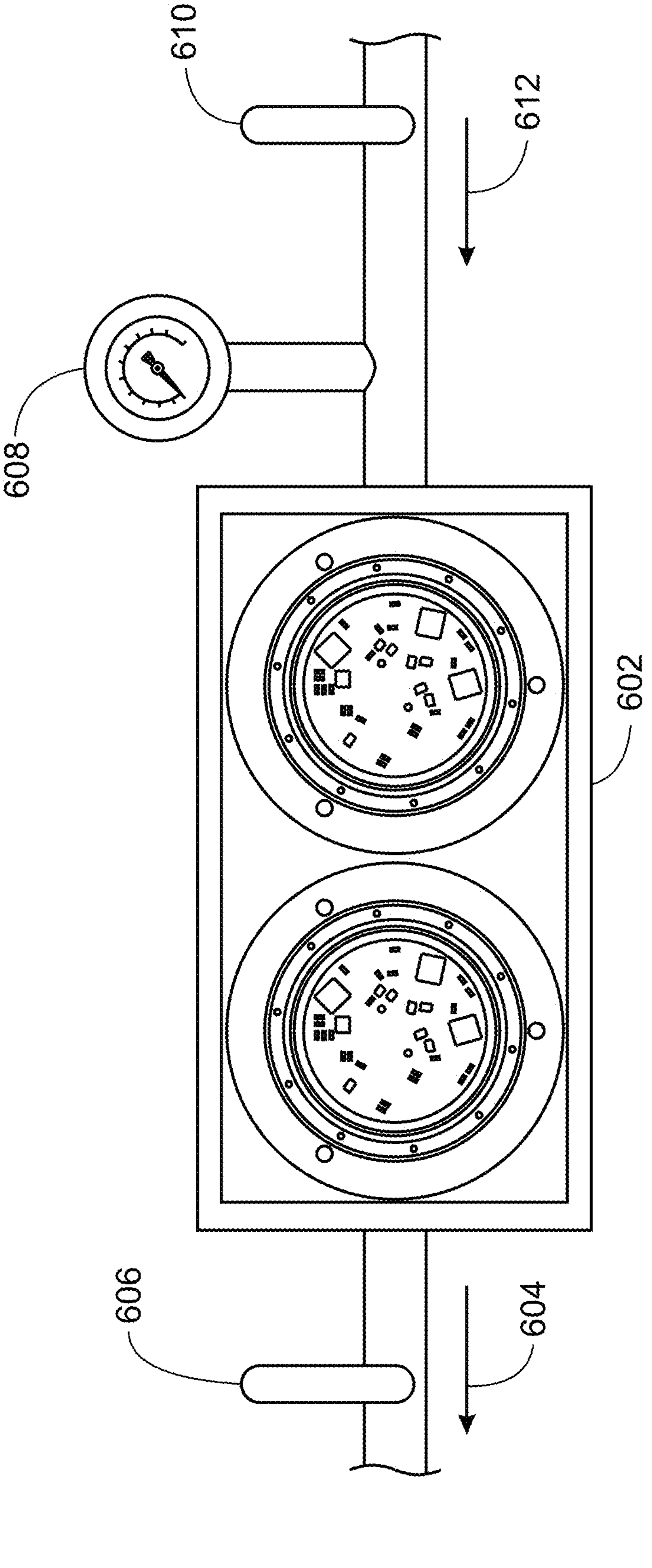
FIG. 6 is a schematic diagram of the introduction of dry gas into the open volume of the housing.

FIG. 6 is a schematic diagram of the introduction of dry gas into the open volume of the housing 104. To begin, the partially assembled underwater light fixture 102 of FIG. 5B is placed in a vacuum chamber 602. The vacuum chamber 602 is sealed, and a vacuum 604 is pulled to evacuate the air from the vacuum chamber 602 by opening a vacuum valve 606 to a vacuum pump (not shown). In some embodiments, a vacuum gauge 608 is used to indicate that the pressure has reached the lowest vacuum that can be pulled by the vacuum pump, such as 0.1 torr (0.13 mbar), 0.5 torr (0.67 mbar), 1.0 torr (1.33 mbar), or 5.0 torr (6.67 mbar). After the air is evacuated, the vacuum valve 606 is closed, and a dry gas valve 610 is opened to introduce a dry gas 612 into the vacuum chamber 602. If the pressure levels after the vacuum is at the lowest point is not low enough to achieve desired a dew point, multiple cycles of vacuum and dry gas introduction may be performed. For example, two cycles, three cycles, or more, may be performed to achieve a sufficiently low dewpoint. The rate of pulling the vacuum and of introducing the dry gas is controlled to avoid placing stress on the components while exchanging gas in the open spaces of the partially-assembled underwater lighting fixture.

After the air in the open space of the housing 104 has been replaced with dry gas, the open space is sealed to prevent further air exchange. For example, referring to FIG. 5B, this is performed inserting a mounting screw into the remaining mounting hole 206 at an end of the pass-through connector 204. Once this is performed, final assembly of the underwater light fixture may be completed.

Figure 7A:
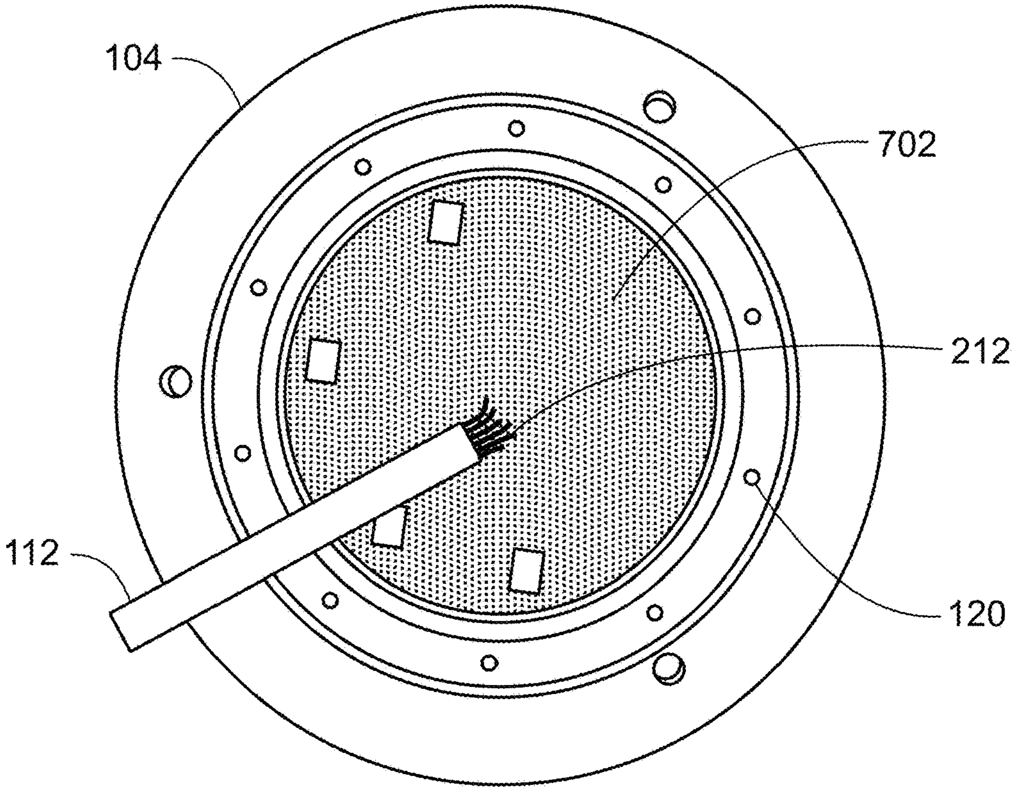
FIG. 7A is a rear view of the housing showing the cable soldered to the pins of the control circuit board and a layer of potting compound applied over the control circuit board.
Figure 7B:
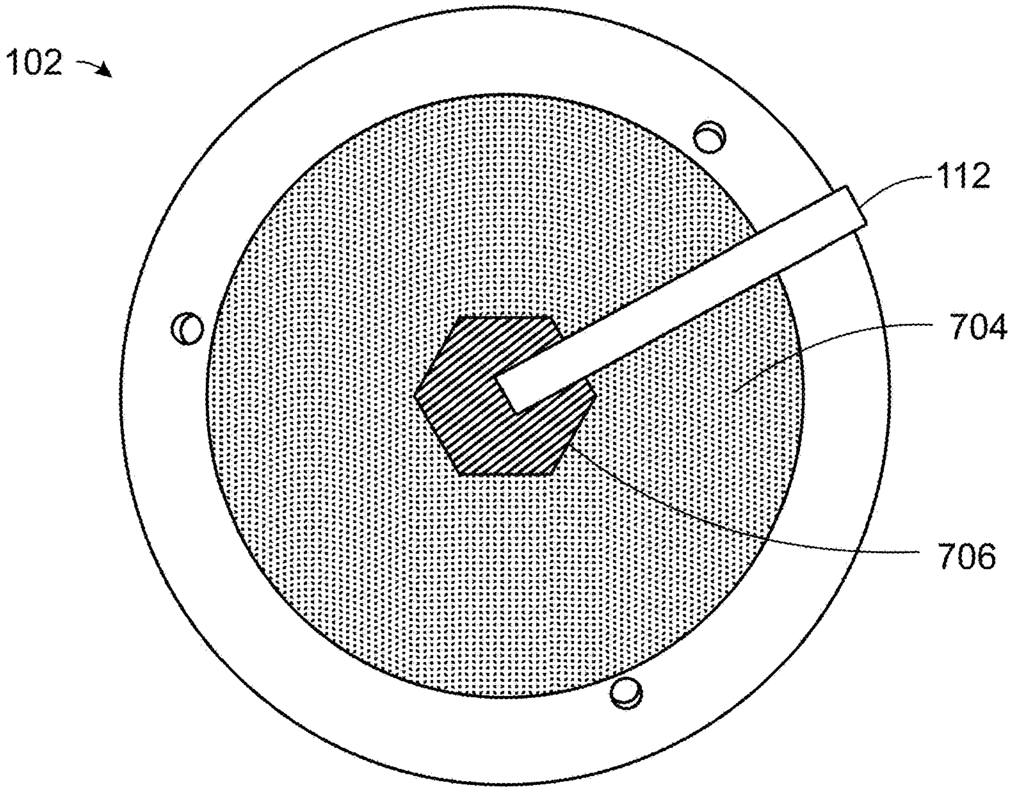
FIG. 7B is a rear view of the housing showing the back plate, cable, and cable nut.

FIG. 7A is a rear view of the housing showing the cable 112 soldered to the pins 212 of the control circuit board and a layer of potting compound 702 applied over the control circuit board. The potting compound 702 further seals the underwater light fixture 102, protecting the electronics from water intrusion. In various embodiments, the potting compound 702 is an epoxy compound, or an RTV compound, and the like. Once the potting compound 702 has set, a back plate 704 is threaded over the cable 112 and sealed to the underwater light fixture 102 by screws inserted through the back plate 704 into the mounting holes 120 in the housing 104. A cable nut 706 can then be threaded over the cable 112 and screwed to a fitting attached to the back plate 704. In some embodiments, a separate mounting plate may be attached to the back plate 704 by adhesive. In these embodiments, the fitting for the cable is part of the separate mounting plate. FIG. 7B is a rear view of the housing 104 showing the back plate 704, cable 112, and cable nut 706.

Figure 8:
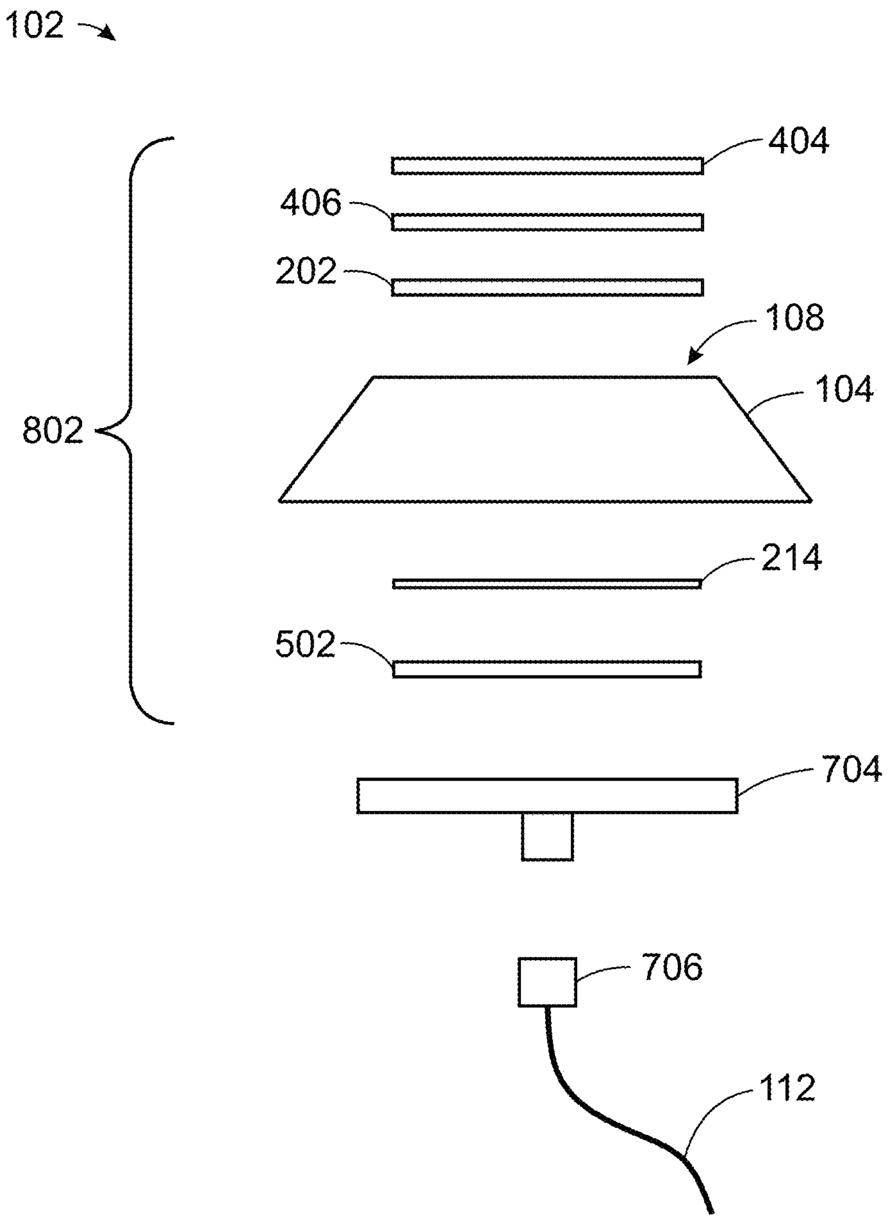
FIG. 8 is a simplified exploded figure showing the components of the underwater light fixture.

FIG. 8 is a simplified exploded figure showing the components of the underwater light fixture 102. Like numbered items are as described with respect to previous figures. As described herein, in an embodiment, the underwater light fixture 102 includes a clear faceplate 404 mounted to an opening 108 in a housing using an O-ring 406 between the opening 108 and housing, with an adhesive to bond the parts. A lighting circuit board 202 has a thermal pad 214 attached and is installed in the housing 104. A control circuit board 502 is mounted to the lighting circuit board 202 proximate to the thermal pad 214. In this embodiment, one of two screws (not shown) is installed in the control circuit board 502 to mount it to the lighting circuit board 202. A second screw is left out to allow gas exchange between the back of the control circuit board 502 and the open space in the housing 104. This assembly 802 is then placed in a vacuum chamber and a cycle of vacuum and dry air is performed, at least once, to exchange air in the open space of the housing 104 with dry air. Once the exchange is complete, the second screw is installed in the control circuit board 502 and the assembly of the underwater light fixture 102 is completed as described herein. The use of a portion of the construction, for example, a mounting hole that couples to open space in the housing 104, is not limited to the construction shown here. In other embodiments, a specific port built into the underwater light fixture 102 evacuate the open space. This may be useful when an underwater light fixture 102 is to be used in a very low temperature environment, such as a polar application.

Figure 9:
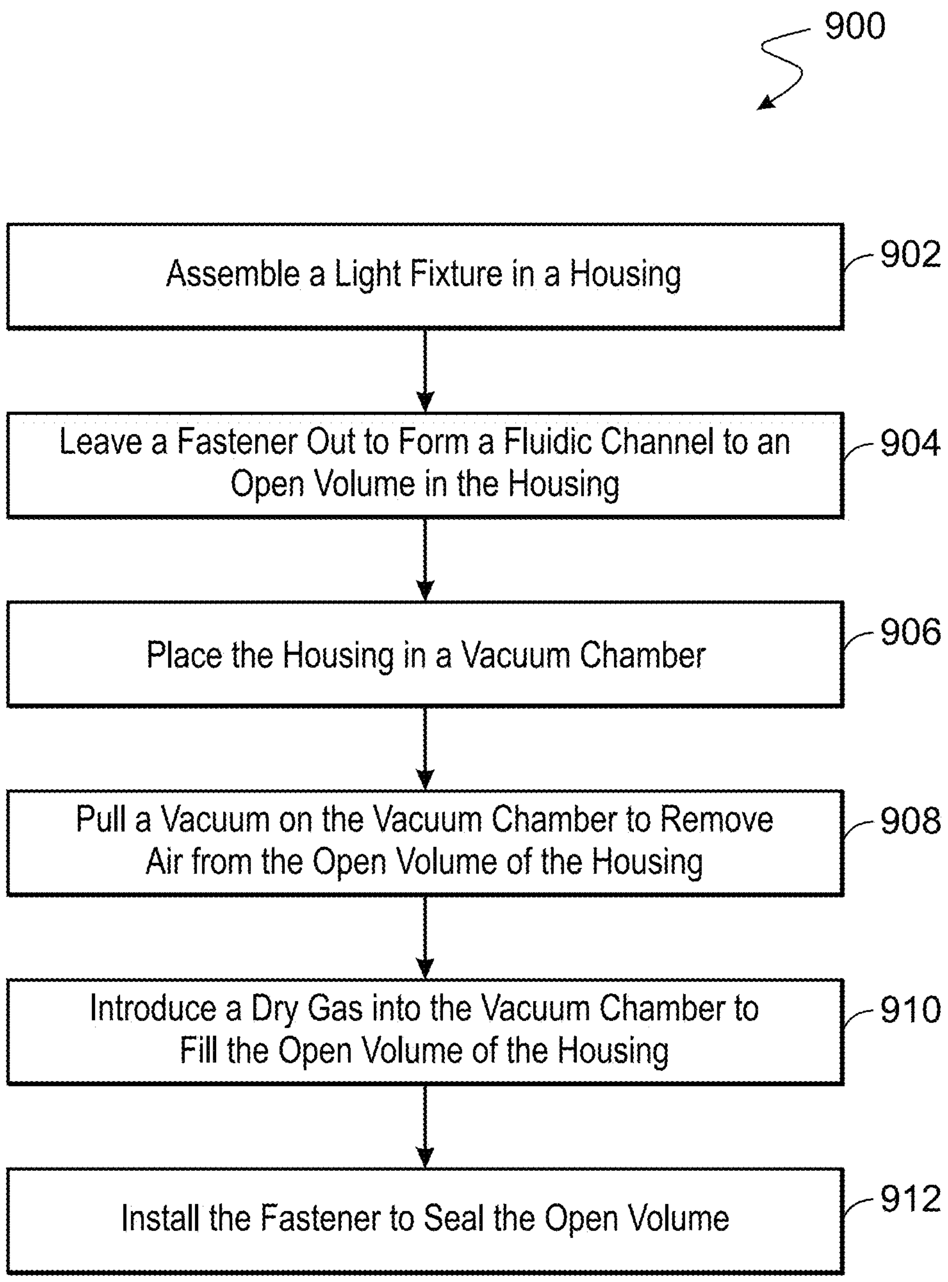
FIG. 9 is a process flow diagram of a method 900 for making an underwater light fixture.

FIG. 9 is a process flow diagram of a method 900 for making an underwater light fixture. The method 900 begins at block 902 with the assembly of a light fixture in a housing. At block 904, a fastener, such as a screw, is left out of the light fixture to provide a fluidically coupling to open volume in the housing through the opening for the fastener. At block 906, the housing is placed in a vacuum chamber. At block 908, a vacuum is pulled on the vacuum chamber to remove air from the open volume of the housing through the opening for the fastener. At block 912, a dry gas is introduced into the vacuum chamber to fill the open volume in the housing. At block 914, the fastener is installed in the light fixture to seal the open volume.

EMBODIMENTS

An embodiment described herein provides a method for making an underwater light fixture. The method includes assembling a light fixture in a housing, leaving a fastener out of the light fixture, wherein an opening for the fastener fluidically couples to open volume in the housing. The housing is placed in a vacuum chamber, and a vacuum is pulled on the vacuum chamber to remove air from the open volume of the housing. A dry gas is introduced into the vacuum chamber to fill the open volume in the housing, and the fastener is installed in the light fixture to seal the open volume.

In an aspect, the method includes cycling between pulling the vacuum and introducing the dry gas for at least two iterations before installing the fastener.

In an aspect, the method includes performing the assembly in a clean room.

In an aspect, the method includes maintaining a temperature between about 22° C. and about 28° C. during the assembly of the lighting fixture.

In an aspect, the method includes maintaining a relative humidity between about 30% and about 40% during the assembly of the lighting fixture.

In an aspect, assembling the light fixture in the housing includes attaching a thermal pad to a back of a lighting circuit board, mounting the lighting circuit board in the housing with lighting elements mounting on the lighting circuit board facing an opening in the housing, sealing a clear plate to the housing over the lighting circuit board, and mounting a control circuit board to the back of the lighting circuit board.

In an aspect, the method includes mounting a lens plate over the lighting circuit board before sealing the clear plate to the housing.

In an aspect, the method includes heating the lighting circuit board to about 80° C. for about 30 minutes to volatilize organic compounds before attaching the thermal pad.

In an aspect, the method includes soldering a cable to the control circuit board.

In an aspect, the method includes disposing a layer of potting compound over the control circuit board.

In an aspect, the method includes mounting a back plate to the housing over the layer of potting compound.

Another embodiment described in examples herein provides an underwater light fixture. The underwater light fixture includes a casing including a housing and a back plate, wherein the housing includes an opening for light exiting the housing, and the back plate includes an opening for a cable. A lighting circuit board that is mounted in the housing with visible lighting elements mounted on a front surface directed at the opening in the housing. The underwater light fixture includes a lens plate that is mounted over the lighting elements, and a clear plate that is mounted over the opening in the housing. The underwater light fixture includes a control circuit board that is mounted to the back of the lighting circuit board, wherein the back plate is mounted over the control circuit board. The underwater light fixture includes a cable coupled to the lighting circuit board and a dry gas disposed in open space in the housing.

In an aspect, the underwater lighting fixture includes a thermal pad disposed between the lighting circuit board and the control circuit board.

In an aspect, the underwater lighting fixture includes a potting compound disposed between the control circuit board and the back plate.

In an aspect, the underwater lighting fixture includes the lighting circuit board includes ultraviolent lighting elements mounted on a front surface directed at the clear plate.

In an aspect, each of the lighting elements includes individual light emitting diodes.

In an aspect, the dry gas includes nitrogen.

In an aspect, the dry gas includes air.

In an aspect, the dry gas includes argon.

Other implementations are also within the scope of the following claims.

What is claimed is:

1. A method for making an underwater light fixture, the method comprising:

assembling a light fixture within a housing, leaving a fastener out of the light fixture, wherein an opening for the fastener fluidically couples to an open volume in the housing;

placing the housing in a vacuum chamber;

pulling a vacuum on the vacuum chamber to remove air from the open volume of the housing;

introducing a dry gas into the vacuum chamber to fill the open volume in the housing;

installing the fastener in the light fixture to seal the open volume; and sealing the housing with the fastener in the light fixture within the housing.

2. The method of claim 1, comprising cycling between pulling the vacuum and introducing the dry gas for at least two iterations before installing the fastener.

3. The method of claim 1, comprising performing the assembly in a clean room.

4. The method of claim 3, comprising maintaining a temperature between about 22° C. and about 28° C. during the assembly of the light fixture.

5. The method of claim 3, comprising maintaining a relative humidity between about 30% and about 40% during the assembly of the light fixture.

6. The method of claim 1, wherein assembling the light fixture in the housing comprises:

attaching a thermal pad to a back of a lighting circuit board;

mounting the lighting circuit board in the housing with lighting elements mounting on the lighting circuit board facing an opening in the housing;

sealing a clear plate to the housing over the lighting circuit board; and mounting a control circuit board to the back of the lighting circuit board.

7. The method of claim 6, comprising mounting a lens plate over the lighting circuit board before sealing the clear plate to the housing.

8. The method of claim 6, comprising heating the lighting circuit board to about 80° C. for about 30 minutes to volatilize organic compounds before attaching the thermal pad.

9. The method of claim 6, comprising soldering a cable to the control circuit board.

10. The method of claim 6, comprising disposing a layer of potting compound over the control circuit board.

11. The method of claim 10, wherein the layer of potting compound seals the underwater light fixture.

12. The method of claim 10, wherein the layer of potting compound seals the underwater light fixture.

13. The method of claim 12, wherein installing the fastener comprises inserting the screw into a mounting hole.

14. The method of claim 10, mounting a back plate to the housing over the layer of potting compound.

15. The method of claim 6, wherein installing the fastener mounts the control circuit board to the lighting circuit board.

16. The method of claim 6, wherein installing the fastener mounts the control circuit board to the lighting circuit board.

17. The method of claim 1, wherein the fastener is a screw.

* * * * *